3,028,398
PREPARATION OF α-PHENYL ACETONE COMPOUNDS
Robert D. Hoffsommer, Jr., and David Taub, Metuchen, and Norman L. Wendler, Summit, N.J., assignors to Merck & Co., Inc., Rahway, N.J., a corporation of New Jersey
No Drawing. Filed Aug. 1, 1960, Ser. No. 46,341
5 Claims. (Cl. 260—340.5)

This invention relates to a new process for preparing ketones. More specifically, this invention relates to a process for preparing compounds of the structure

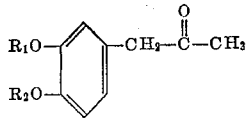

in which $R_1$ may be methyl and $R_2$ hydrogen or $R_1$ and $R_2$ may be a methylene bridge which process comprises agitating a solution of a 3,4-dioxygenated propenyl benzene such as isoeugenol or isosafrole in a solvent inert to oxidation by peracids with a stoichiometric excess of an organic peracid, such as peracetic acid, followed by removal of the peracid and isolation of the product.

The discovery that α-methyl-β-3,4-dioxyphenylalanine is a good hypotensive agent has led to the search for better ways of preparing this compound. This compound is usually prepared from an intermediate ketone, usually either a dimethoxyphenylacetone or a methoxyhydroxyphenylacetone. From this ketone the synthesis may be carried out either by a Strecker reaction or by a hydantoin route.

In the past, these intermediate ketones have been made by one of several methods, each of which involved a series of steps. One of the best of these methods used as its starting material vanillin and arrived at the ketone by successively condensing vanillin with nitro ethane, reducing and hydrolyzing the resultant nitropropenylmethoxyphenol.

We have found a new process for the direct preparation of the methoxyhydroxyphenylacetone from cheap and available starting material. The process of our invention consists of carrying out the oxidation of isoeugenol or isosafrole with an organic peracid such as peracetic, performic, peroxytrifluoracetic perphthalic acid and the like. It is an advantage of our invention that the starting materials are cheap and easily available. It is a further advantage of the process of our invention that the starting materials are actually one step earlier in the synthesis than the best process heretofore known, since vanillin is often obtained from isoeugenol. It is a further advantage of the process of our invention that the desired ketone is obtained in one reaction step.

In the process of our invention, the starting materials are either isoeugenol or isosafrole. Since the alkyl groups are removed from the alkoxy substituents on the ring at the end of the synthesis of the α-methyldioxyphenylalanine, the exact character of the alkoxy groups in the intermediates does not affect the nature of the final product.

The oxidation is carried out using a solvent which is inert to peracids. The solvent of choice is ethyl acetate, but other solvents such as benzene, methylene chloride, chloroform, or aqueous acetic acid may be used. Peracetic acid, the preferred per-acid, is available as an article of commerce. It can be used either in the commercially-available form which may contain sulfuric acid, or it can be purified if so desired. Other peracids such as per benzoic acid, performic acid, peroxytrifluoroacetic acid, perphthalic acid and the like are equally well usable.

The reaction is conveniently carried out at room temperature or below, which results in a shorter reaction time although higher temperatures, up to 60° C., can be used. The peracetic acid is usually added slowly to the solution of the isoeugenol or isosafrole. The mixture is then agitated until analysis shows that one mole equivalent of the peracetic acid has been used. The mixture of peracetic acid and acetic acid is then removed by vacuum distillation. Conveniently, this is done by azeotropic distillation using a solvent which will form an azeotrope with these compounds. Distillation is carried out under reduced pressure below 40° C. Conveniently, ethyl benzene is used as the azeotropic component. Other compounds forming azeotropes with acetic acid can equally well be used.

After the acetic acid and peracetic acid has been removed and the solvent has been removed under reduced pressure, the residual oil is distilled in a vacuum. The product is obtained as a result of the fractionation. Formation of the semicarbazone is a convenient method of purification.

Our invention can be illustrated by the following examples:

Example 1

A mixture of 10 g. of isoeugenol in 10 ml. of ethyl acetate is chilled to 20° C. There is then added, dropwise with stirring, 45 ml. of peracetic acid while keeping the reaction mixture at 20–23° C. The reaction mixture is then stirred at 20–30° C. while aliquots are titrated to follow the peracetic acid consumption. When one equivalent weight of peracetic acid has been used the mixture is added, dropwise, to ethyl benzene which is refluxing at 30-40 mm. pressure. The mixture is then dried, keeping the desired temperature below 40° C. The acetic acid and peracetic acid are removed as an azeotrope, after which the ethyl benzene and the methyl acetate are removed. The residual material is dissolved in 300 cc. chloroform and the solution is washed successively, first with 200 ml. of water, then three times with 100 ml. of water. The solution is then dried over sodium sulfate and concentrated under reduced pressure. The residual oil is distilled to yield 1-(4-hydroxy-3-methoxyphenyl)-propanone-2.

Example 2

The process of Example 1 is followed using an equivalent quantity of isosafrole in place of the isoeugenol. The product obtained is 1-(3,4-methylenebisoxyphenyl)-propanone-2.

Example 3

To a stirred solution of 10 g. of isoeugenol in 60 ml. of methylene chloride, cooled to 0° C., there is added dropwise (10 minutes) 35 ml. of 2 M peroxytriflouracetic acid in methylene chloride. The solution is kept at 25° for one hour, and 60 ml. of 5% cold aqueous sodium hydroxide is added. The organic layer is separated, washed with water, and dried over sodium sulfate. Distillation of the residual oil after removal of the methylene chloride yields 1-(4-hydroxy-3-methoxyphenyl)propanone-2.

We claim:
1. A process for preparing compounds of the structure

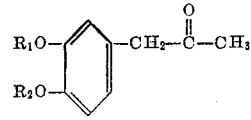

in which $R_1$ is selected from the group consisting of methyl and together with $R_2$ is a methylene bridge and $R_2$ is selected from the group consisting of hydrogen and together with $R_1$ a methylene bridge, which comprises agitating a solution of a compound of the structure

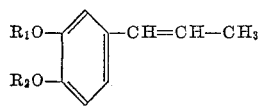

in a solvent inert to oxidation by peracids with a stoichiometric excess of an organic percarboxylic acid below 60° C. until at least one equivalent of peracid is consumed, followed by removal of solvent and per-acid under reduced pressure below 40° C. and distillation of the residue to isolate the desired ketone.

2. The process of claim 1 in which the per-acid is peracetic acid.

3. The process of claim 2 in which $R_1$ is methyl and $R_2$ is hydrogen.

4. The process of claim 2 in which $R_1$ and $R_2$ together are methylene.

5. The process of claim 3 in which the inert solvent is methyl acetate and the removal of the acetic and peracetic acids is azeotropic in the presence of ethylbenzene.

References Cited in the file of this patent

Meerwein et al.: Chemical Abst., vol. 20, page 2674 (1926).

Boeseken et al.: Rec. Trav. Chim., vol. 48, pages 363–69 (1929).

Milas: J. Am. Chem. Soc., vol. 52, page 752 (1930).